United States Patent
Appaji et al.

(10) Patent No.: US 7,864,682 B2
(45) Date of Patent: Jan. 4, 2011

(54) METHOD FOR ROUTING DATA IN NETWORKS

(75) Inventors: Anu Appaji, Plano, TX (US); Cornelius van Rensburg, Dallas, TX (US); Baowei Ji, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 907 days.

(21) Appl. No.: 11/426,757

(22) Filed: Jun. 27, 2006

(65) Prior Publication Data
US 2007/0297388 A1 Dec. 27, 2007

(51) Int. Cl.
H04L 12/28 (2006.01)

(52) U.S. Cl. .................. 370/235; 370/252; 370/338; 370/351; 709/238; 455/445

(58) Field of Classification Search .................. None
See application file for complete search history.

(56) References Cited

U.S. PATENT DOCUMENTS

| | | | | |
|---|---|---|---|---|
| 6,377,544 B1 * | 4/2002 | Muthukrishnan et al. | ... | 370/229 |
| 6,604,137 B2 * | 8/2003 | Cowan et al. | ............... | 709/224 |
| 6,748,433 B1 * | 6/2004 | Yaakov | ....................... | 709/224 |
| 2001/0015970 A1 * | 8/2001 | Brandt et al. | ............... | 370/352 |
| 2005/0249215 A1 * | 11/2005 | Kelsey et al. | ............... | 370/392 |
| 2006/0268792 A1 * | 11/2006 | Belcea | ....................... | 370/338 |
| 2007/0008927 A1 * | 1/2007 | Herz et al. | .................. | 370/331 |
| 2007/0073854 A1 * | 3/2007 | Lindquist | .................... | 709/223 |
| 2007/0291791 A1 * | 12/2007 | English et al. | ............. | 370/469 |

* cited by examiner

*Primary Examiner*—Chi H. Pham
*Assistant Examiner*—Shick Hom

(57) ABSTRACT

A method for routing data in a network is disclosed. As an example, a method for routing data in a wireless mesh network is disclosed. The method determines what type of data is to be routed, associates the type of data with one or more routing link performance parameters such as, for example, link latency and link capacity, selects a plurality of nodes based on the one or more routing link performance parameters, determines what node of the plurality of nodes provides an optimal level of performance associated with the one or more routing link performance parameters, and selects that node as a recipient node for the data to be routed.

20 Claims, 2 Drawing Sheets

METHOD FOR ROUTING DATA IN NETWORKS

FIELD OF THE INVENTION

The invention relates to the telecommunications field, and more particularly, but not exclusively, to a method for routing data in telecommunication networks.

BACKGROUND OF THE INVENTION

A mesh network is a network in which each node is connected directly to a plurality of other nodes. The connections between nodes can be wired or wireless. If a node in a mesh network is inoperable, all of the other nodes can still communicate with each other, either directly or through one or more intermediate nodes. Therefore, the node and path redundancy provided by mesh networks makes them highly reliable compared to other network designs.

There are numerous mesh network routing protocols that define the routing algorithms used to convey data between nodes. For example, Ad Hoc On-Demand Distance Vector (AODV), Temporary Ordered Routing Algorithm (TORA), and Dynamic Source Routing (DSR) are routing protocols designed for ad hoc wireless, fixed or mobile mesh networks. An ad hoc ("spontaneous") network is a meshed network with wireless fixed and/or mobile connections.

The existing routing protocols/algorithms for ad hoc and other mesh networks are designed to support Quality of Service-(QoS)-sensitive applications. In these applications, QoS-related parameters (e.g., performance, throughput, capacity, loading, latency, jitter, availability, etc.) are specified for certain types of traffic. For example, streaming or real-time traffic requires high network throughput and capacity, Voice over IP (VOIP) traffic requires low latency and jitter, voice traffic requires low latency, and safety-critical traffic requires high availability. However, a significant problem with the existing routing algorithms/protocols is that each routing algorithm is designed optimally to support only one or two QoS-related parameters throughout a network, but all types of traffic are being routed through the networks involved. For example, AODV is designed to utilize bandwidth efficiently and minimize network load, TORA is designed to minimize communication overhead and conserve bandwidth, and DSR is designed to minimize overhead and maximize throughput. Network operators compensate for the design limitations of these routing algorithms, by generously over-provisioning network resources so that each type of traffic receives a required level of service. Consequently, because of the design limitations of existing routing algorithms, network operators are required to provide excess network resources that are substantially underutilized, and more importantly, bandwidth is inefficiently used.

SUMMARY OF THE INVENTION

The present invention provides a method for routing data in a network. In an example embodiment, the method is used for a wireless mesh network. The method determines what type of data is to be routed, associates the type of data with one or more routing link performance parameters such as, for example, link latency and link capacity, selects a plurality of nodes based on the one or more routing link performance parameters, determines what node of the plurality of nodes provides an optimal level of performance associated with the one or more routing link performance parameters, and selects that node as a recipient node for the data to be routed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
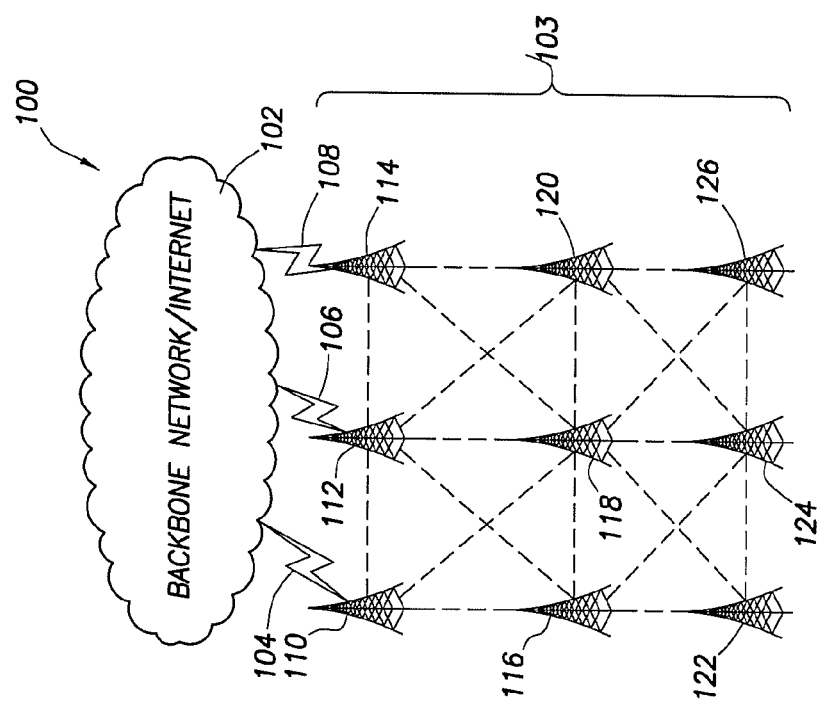
FIG. 1 depicts a pictorial representation of an example telecommunication system, which can be used to implement an embodiment of the present invention.

With reference now to the figures, FIG. 1 depicts a pictorial representation of an example telecommunication system 100, which can be used to implement an embodiment of the present invention. For this illustrative embodiment, system 100 includes a backbone network 102, and a wireless mesh network 103 connected to backbone network 102 by a plurality of wireless data communication connections 104, 106, 108. Mesh network 103 is composed of a plurality of telecommunication nodes 110 through 126. Backbone network 102 provides a pathway for exchanges of data between mesh network 103 and other networks or sub-networks. The data being exchanged can be packetized or single stream. For this illustrative embodiment, backbone network 102 provides a gateway that connects mesh network 103 to the Internet or other private network via one or more wired or wireless connections.

In mesh network 103, each of nodes 110 through 126 may function as a Base Station (BS), Subscriber Station (SS) or both, and includes a network transceiver to forward or receive data to or from other nodes. For enhanced network performance, each node's transceiver may be implemented, for example, with Multiple-Input Multiple-Output (MIMO) antenna technology to transmit or receive different streams of data simultaneously to or from transceivers in other nodes. Each node 110 through 126 can be fixed or mobile (units that change position over time). For this example embodiment, the connections between nodes 110 through 126 are wireless, but in a different embodiment, these connections could be wired, or a combination of wireless and wired connections. If mesh network 103 is implemented as an ad hoc network, each node 110 through 126 can be a mobile node, such as, for example, a mobile host or router, client, peer or repeater, laptop computer, Personal Digital Assistant (PDA) or radiotelephone. Also, as an ad hoc network, mesh network 103 is a multi-hop network in which the connections between neighboring nodes are made by the nodes on demand. The numerous hop paths available between nodes in mesh network 103 are indicated by the dashed lines.

The present invention provides a method for routing data in networks, which can be implemented, for example, using mesh network 103. Generally, for this illustrative embodiment, assume that each node 110 through 126 is capable of determining the topology of mesh network 103 and multiple routes for data to reach a destination node. Also, assume for this example, that each node 110 through 126 includes suitable antenna technology (e.g., MIMO) that enables each node to transmit or receive different data streams simultaneously to or from other nodes. Note that the topology determination capabilities of the nodes and the antenna technologies used are exemplary network elements and not required to implement the present invention.

For illustrative purposes, assume that node 124 is an SS node, which has received (from suitable subscriber equipment) a plurality of data packets destined for node 112. Node 124 can choose to forward each packet to node 112 via one (or all) of nodes 116, 118, 120. However, assume that node 124 has received a plurality of data packets from a subscriber for applications of different data service classes (e.g., voice call, file transfer, etc.), and these data packets of different service classes are to be routed to node 112. The present invention enables a source node (e.g., node 124) to expedite and optimize the delivery of a subscriber's data packets to a destination node (e.g., 112), by determining the routing path for each packet based on the type of application involved. Consequently, each data packet of one service class (e.g., voice calls) may traverse a route to a destination node that is different than the route traversed by each data packet of another service class (e.g., file transfers). Examples of data service classifications used for existing wireless radiotelephone air interface protocols are shown below in Table 1. However, the classes and technologies described in Table 1 are provided for illustrative purposes, and the method of the present invention is not limited in scope to the applications, classes, protocols or technologies shown.

TABLE 1

Application classes defined for certain wireless protocols

| Cdma2000 family | WCDMA family | 802.16 (WiMAX) |
|---|---|---|
| Three data service classes: | Four data service classes: | Four data service classes: |
| Assured mode: | Conversational: VoIP, | Real-time periodic application (i.e., unsolicited grant service) |
| 15 user priority sets | video-conferencing | |
| 7 data rate sets | Streaming: video-on-demand | Real-time polling service |
| 8 data loss sets | | Non-real-time polling service |
| 7 delay sets | Interactive: web browsing, telnet | |
| Non-assured mode: | | Best-effort service |
| 14 user priority sets | Background: file downloading | |
| Best effort mode | | |

Figure 2:
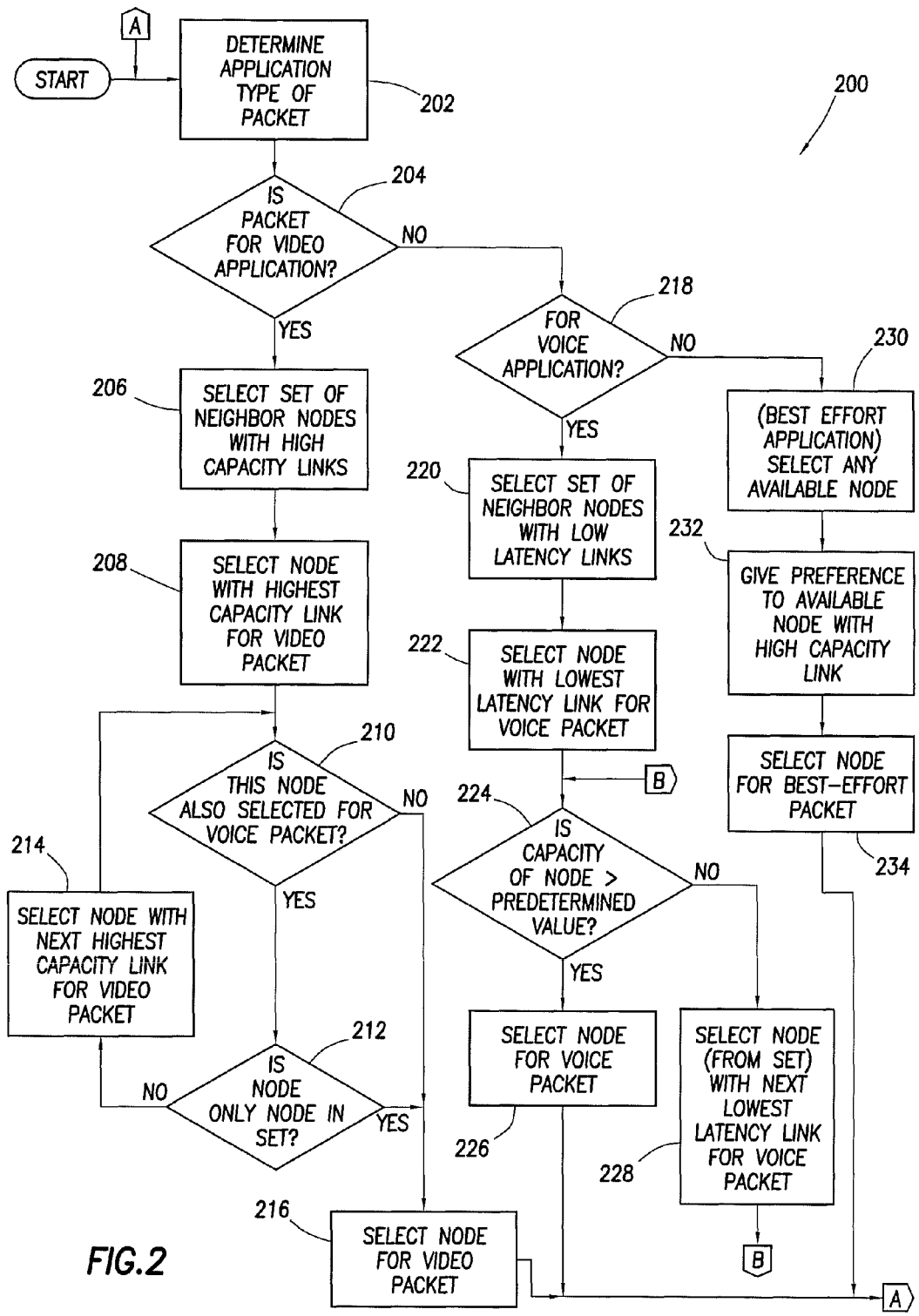
FIG. 2 is a flow chart depicting a method for routing data in a network, which can be used to implement an embodiment of the present invention.

FIG. 2 is a flow chart depicting a method 200 for routing data in a network, which can be used to implement an embodiment of the present invention. For example, method 200 can be used for routing data packets in network 103 shown in FIG. 1. However, although network 103 is a mesh network having a particular topology, method 200 is not limited only to routing data packets in mesh networks. Method 200 can be used for routing data in any suitable network that includes a plurality of nodes, the paths for routing data between nodes can be fixed or wireless, the nodes can determine the network's topology and routing path(s) to be used, and the data to be routed can be packetized or single stream data.

Referring to FIGS. 1 and 2 for this illustrative embodiment, assume that a source node (e.g., node 124) has received data (e.g., from subscriber equipment) in packet form, and the data packet is to be routed to a destination node (e.g., node 112) in network 103. Method 200 begins by enabling the source node (e.g., digital processor or device in that node) to determine the application type of that data packet (step 202). For example, that packet can include data for a video, voice or best-effort type of application, and the source node can determine the application type by reading the Class of Service (CoS) or Differentiated Services (Diffserv) markings in that packet. Data packets are typically marked according to the class or type of service that they need.

For this example embodiment, the source node determines if the received packet is for a video application (step 204). Note that method 200 is not limited only to the types of applications shown in FIG. 2, or the order in which method 200 addresses each type of application. For example, at step 204, method 200 could enable the source node to determine if the received packet is for a voice application, best-effort application, or any application/class shown in Table 1 (e.g., Assured mode service class for cdma2000).

If (at step 204) the source node determines that the received packet is for a video application, the source node selects a set of neighbor nodes in which each neighbor node provides a relatively high level of channel capacity in the data communication link between itself and the source node (step 206). For example, the source node (e.g., node 124) may determine that two neighbor nodes (e.g., nodes 116, 120) form a set in which each node provides a relatively high level of link channel capacity, and a third neighbor node (e.g., node 118) does not provide sufficient link channel capacity and is not included in the set. The source node selects (from the set) the node that provides the highest level of link channel capacity (step 208), and then determines if the selected node has also been selected for a voice packet (step 210). For example, the source node 124 may determine that node 120 provides the highest level of link channel capacity from the high link channel capacity set, so node 124 also determines if node 120 has been selected as a recipient for a voice packet (e.g., steps described below). If not, then the source node selects that node (e.g., node 120) as an intended recipient of the video data packet (step 216). The source node (124) can then route the video data packet to the selected, intermediate node (120).

Returning to step 210, if the source node determines that the node selected for the video data packet has also been selected as a recipient for a voice packet, the source node determines if that node is the only node remaining to be selected from the high link channel capacity set of nodes (step 212). If so, the source node selects that node as the intended recipient for the video packet (step 216). If not, the source node selects the node with the next highest level of link channel capacity (step 214), and method 200 returns to step 210.

Returning to step 204, if the source node determines that the received packet is not for a video type of application, the source node determines if the packet is for a voice type of application (step 218). If so, the source node selects a set of neighbor nodes in which each neighbor node provides a relatively low level of latency (delay) in the data communication link between itself and the source node (step 220). For example, the source node (e.g., node 124) may determine that two neighbor nodes (e.g., nodes 116, 118) form a set in which each node provides a relatively low level of link latency, and a third neighbor node (e.g., node 120) does not provide a sufficiently low level of link latency and is not included in the set. The source node selects (from the set) the node that provides the lowest level of link latency (step 222). For example, the source node (124) may determine that neighbor node 116 provides the lowest level of link latency from the nodes included in the low link latency set.

For this example embodiment, the source node determines if the selected node also provides a sufficiently high level of link channel capacity (step 224). If the link channel capacity of the selected node is greater than a predetermined value, the source node selects that node as the intended recipient of the voice packet (step 226). The source node (124) can then route the voice packet to the selected, intermediate node (e.g., node 116). However, if (at step 224) the link channel capacity of the selected node is not greater than the predetermined value, the source node selects the node (from the low latency link set) that provides the next lowest level of link latency (step 228), and method 200 returns to step 224.

Returning to step 218, if the source node determines that the received data packet is not for a voice type of application, the source node selects any available neighbor node as the intended recipient of the packet (step 230). For this example embodiment, it may be assumed (for illustrative and explanatory purposes only) that if the received packet is not for a video or voice type of application, it is for a best-effort type of application. If the source node has more than one node available to receive the best-effort packet, the source node determines which of the available nodes provides a sufficiently high level of link channel capacity (step 232), and selects one of those nodes as the intended recipient for the best-effort packet (step 234). The source node (124) can then route the best-effort packet to the selected, intermediate node (e.g., one of nodes 116, 118).

Figure 3:
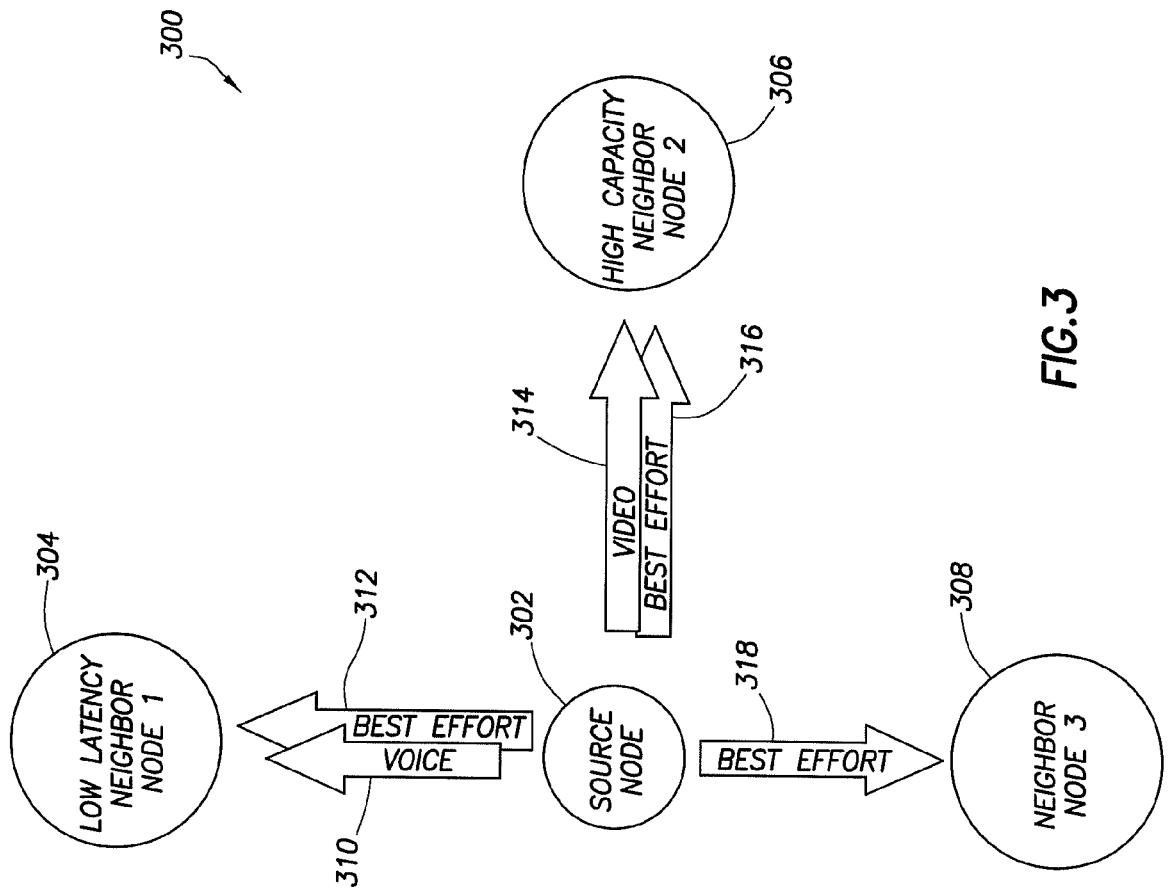
FIG. 3 depicts a pictorial representation of a network, which illustrates an exemplary use of the present invention.

FIG. 3 depicts a pictorial representation of a network 300, which illustrates an exemplary use of the present invention. Network 300 represents a subsection of a mesh network, and the subsection includes a source node 302 and three neighbor nodes 304, 306, 308. For example, network 300 may represent (source) node 124 and (neighbor) nodes 116, 118, 120 shown in FIG. 1. Node 304 provides a relatively low latency data communication link for node 302, node 306 provides a relatively high capacity data communication link for node 302, and node 308 provides neither a low latency nor high capacity data communication link for node 302. Note that applying the steps of method 200 described above, source node 302 has selected (low latency) neighbor node 304 as the recipient of a voice packet 310 and a best effort packet 312. Also, source node 302 has selected (high capacity) neighbor node 306 as the recipient of a video packet 314 and a best effort packet 316, and neighbor node 308 has been selected by source node 302 as the recipient of a best effort packet 318. The path selected for routing each data packet is determined by the application type of that packet. Thus, the source node performs application-based routing of data in network 300. Notably, after the source node has forwarded a packet to a recipient, intermediate node, method 200 can be executed by that intermediate node in order to relay the data packet to a destination node. In other words, the recipient or intermediate node becomes a source node for the purpose of executing the steps of method 200.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A method comprising:
   selecting data to be routed;
   determining the type of the data to be routed;
   associating the type of data with at least one routing link performance parameter, wherein the at least one routing link performance parameter relates to a service class of the type of data;
   selecting a plurality of nodes based on the at least one routing link performance parameter;
   determining which node among the plurality of nodes provides an optimal level of performance relative to at least one other of the plurality of nodes associated with the at least one routing link performance parameter for the data;
   selecting that node as a recipient node for the data to be routed;
   verifying that the recipient node has sufficient capacity for the data to be routed; and
   routing the data through a data network comprising at least some of the plurality of nodes based upon the service class of the type of data.

2. The method of claim 1, wherein the steps are performed by a digital processing device in a source node.

3. The method of claim 1, wherein the plurality of nodes comprises a set of neighbor nodes.

4. The method of claim 1, wherein the type of data comprises an application type.

5. The method of claim 1, wherein the data to be routed comprises packet data.

6. The method of claim 1, wherein the data to be routed comprises single stream data.

7. The method of claim 1, wherein the network is a mesh network.

8. The method of claim 1, wherein the network is an ad hoc, multi-hop network.

9. The method of claim 1, wherein the type of data comprises at least one of voice data, real-time data and best effort data.

10. The method of claim 1, wherein the at least one routing link performance parameter comprises link latency, and the optimal level of performance comprises a lowest level of latency.

11. The method of claim 1, wherein the at least one routing link performance parameter comprises link capacity, and the optimal level of performance comprises a highest level of capacity.

12. The method of claim 1, wherein the at least one routing link performance parameter comprises at least one of link throughput, loading, jitter and availability.

13. The method of claim 1, wherein the type of data comprises an application service class for at least one of the cdma2000, WCDMA and WiMAX air interface protocols.

14. A method comprising:
   receiving data to be routed;
   determining an application type for the data to be routed wherein the application type relates to a service class of the type of data;
   associating the application type for the data to be routed to at least one of high link capacity and low link latency;
   selecting a first set of neighbor nodes wherein each node of the first set includes a link for data communication that provides a level of latency less than a predetermined value, determining what node of the first set provides the lowest level of latency, and selecting that node of the first set as a recipient for the data to be routed;
   verifying that the recipient node has sufficient capacity for the data to be routed; and
   routing the data through a data network.

15. A network-comprising:
   a plurality of neighbor nodes, each node of the plurality of neighbor nodes coupled for data communication to a source node, wherein the source node is adapted to:
   determine the type of data to be routed;

associate the type of data with at least one routing link performance parameter wherein the at least one routing link performance parameter relates to a service class of the type of data;

select a subset of nodes from the plurality of neighbor nodes based on the at least one routing link performance parameter;

determine which node among the subset of nodes provides an optimal level of performance associated with the at least one routing link performance parameter;

select that node as a recipient node for data to be routed;

verify that the recipient node has sufficient capacity for the data to be routed; and route the data through at least one of the plurality of neighbor nodes.

16. The network of claim 15, wherein the network comprises at least one of a mesh network and a mobile ad hoc network.

17. The network of claim 15, wherein the type of data comprises an application service class for a wireless air interface protocol.

18. The network of claim 15, wherein the coupling for data communication between nodes comprises at least one of a wireless data link and a wired data link.

19. The network of claim 15, wherein the at least one routing link performance parameter comprises at least one of channel latency, capacity, throughput, loading, jitter and availability.

20. The network of claim 15, wherein the source node is further adapted to forward the data to the recipient node.

* * * * *